United States Patent Office 2,698,821
Patented Jan. 4, 1955

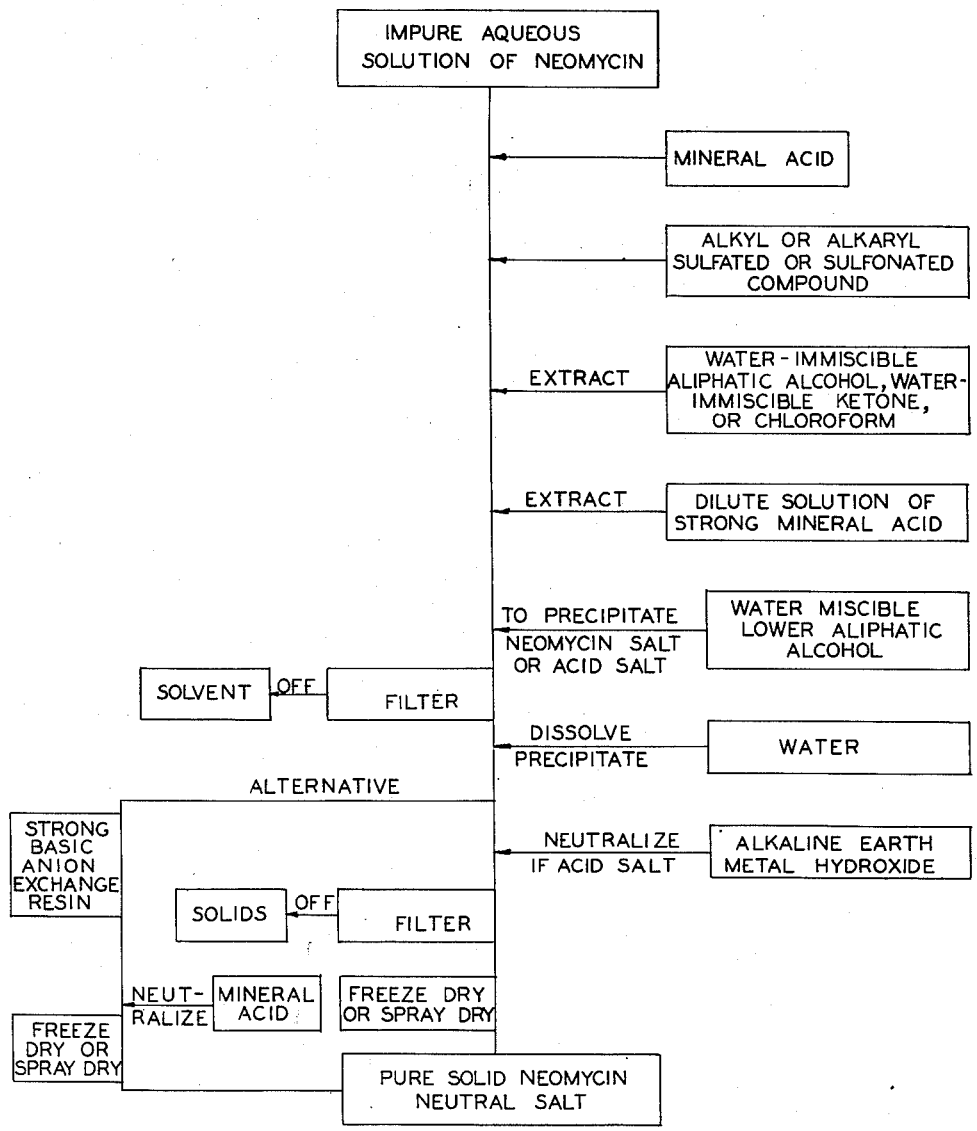

2,698,821

METHOD FOR THE RECOVERY OF NEOMYCIN

Herbert L. Wehrmeister, Terre Haute, Ind., assignor to Commercial Solvents Corporation, Terre Haute, Ind., a corporation of Maryland Application May 24, 1950, Serial No. 164,030

9 Claims. (Cl. 167—65)

My invention relates to a method for the recovery of neomycin from impure aqueous solutions thereof and more particularly it relates to an extraction process for the recovery of neomycin from culture media in which it is produced.

Neomycin, a recent addition to the list of antibiotic substances, was first reported by Waksman and Lechevalier in March, 1949 (Science, Vol. 109, page 305). It is active against many Gram-positive and Gram-negative bacteria. Neomycin has an antibiotic spectrum somewhat similar to streptomycin but is active against many streptomycin-resistant strains of bacteria including *M. tuberculosis*.

Neomycin is produced by a soil organism of the *Streptomyces* species familiar to *Streptomyces fradiae* when grown in nutrient media. The neomycin thus produced is a thermostable, basic compound which is soluble in water. Because of its alkaline nature, neomycin is usually used in the form of its neutral salts, such as, for example, neomycin sulfate.

In the past, the recovery of neomycin from the culture media in which it is produced has been accomplished by various methods including adsorption and elution. These prior processes, however, have not been particularly satisfactory for commercial scale operations and thus it has become increasingly evident that a more direct process was required for the practical and economical recovery of this important new antibiotic.

The process of my invention comprises essentially extracting neomycin from impure aqueous solutions thereof such as filtered acidified culture media to which has been added a compound containing a hydrophobic alkyl or alkaryl group containing at least about six carbon atoms and a sulfonic or sulfonate group, selected from the class consisting of alkylbenzene and alkylnaphthalene sulfonates and sulfonic acids. I carry out the extraction of the neomycin with a compound selected from the group consisting of chloroform, water immiscible dialkyl ketones such as methyl ethyl ketone, water immiscible hydroxy alkanes such as for example, 1-butanol, pentyl alcohol, hexyl alcohol, etc., and water immiscible alkyl and hydroxyalkyl 1,3-dioxolanes, such as 2-propyl-4-hydroxymethyl-1,3-dioxolane and 2,2-dimethyl-1,3-dioxolane. I then extract the neomycin from the organic solvent layer with a dilute solution of a strong mineral acid such as sulfuric, hydrochloric, nitric and perchloric acids and precipitate neomycin as an acid or neutral salt from the dilute acid solution of neomycin by adding a water miscible lower aliphatic alcohol to the dilute solution of neomycin. I then recover the precipitated neomycin salt or acid salt and dissolve it in water. If it is an acid salt which I have recovered I then neutralize the aqueous solution of the neomycin acid salt with a base which forms an insoluble salt with the acid and thus precipitates. The precipitated salt is separated from the solution, and finally the water is removed from the remaining solution to give the dry solid neomycin neutral salt.

The alkyl benzene or naphthalene sulfonic compounds used in the initial step of my process can be added to the medium as an alkali metal salt, such as the sodium salt or it can be added as the free acid such as an alkyl benzene or naphthalene sulfonic acid. In any case, the addition of the material must be preceded by an acidification of the medium. In acidifying the medium I prefer to use mineral acids such as sulfuric acid, hydrochloric acid and phosphoric acid or strong organic acids such as trichloroacetic acid. I add sufficient acid so that the pH of the medium is within the range 2 to 7. I prefer to adjust the pH within the range 3 to 5 and I have obtained best results when I have adjusted the pH to 4.

In adding the alkyl benzene or naphthalene sulfonated compounds as a salt or in the free acid form to the medium, I can use amounts ranging from approximately one-half gram per 100 ml. of medium to the amount which forms a saturated solution of the acid or salt in the medium. Generally the amount to be used depends on the pH of the medium to which the acid or salt is to be added and I have found that at the preferred pH of 4, complete extraction of the neomycin from the medium, which will be more fully explained below, can be obtained with as little as one gram of alkali metal salt of alkyl benzene or naphthalene sulfonic acid per 100 ml. of medium. When the free acid is used, an equivalent amount gives optimum results.

In carrying out this step of my process, I prefer to use the alkali metal salt of alkylbenzenesulfonic acid which is readily available under the trade names "Nacconol" and "Santomerse." "Nacconol" and "Santomerse" are made from kerosene so that while the benzene ring is monosubstituted with alkyl, the alkyl substituent is really a mixture of alkyls. The preparation of these materials, and the free alkylbenzenesulfonic acid is described by Schwartz and Perry in their book Surface Active Agents (Interscience Publishers, Inc., New York, 1949), chapter 5, section II*b*. The preparation of other alkyl aromatic sulfonates, such as that known by the trade name "Nytron" are described in chapter 4, section I of the above-mentioned book.

After adding the sulfur compounds as free acids or as salts to the beer, I then extract the neomycin from the medium with a low molecular weight, water-immiscible organic solvent, as described previously. An unusual characteristic of this extraction step is that within certain limits smaller volumes of the extracting solvent give better extraction than large volumes. I have obtained substantially complete extraction of neomycin from the fermented medium using from ⅛ to 1 volume of extracting solvent per volume of unextracted fermented medium. When using the preferred pH and preferred amounts of alkylbenzenesulfonic acid or its alkali metal salts as shown above, I prefer to use from ⅛ to ½ volume of extracting solvent per volume of unextracted fermented medium.

In carrying out the extraction process I allow the mixture of extractant and filtered fermented medium, which has been treated as above described, to settle into two layers and then draw off the upper alcohol or ketone or the lower chloroform or acetal layer which now contains the neomycin. In this manner a quantitative extraction of the neomycin from the fermented medium is obtained.

After the extraction of the neomycin from the filtered fermented medium by the alcohol, ketone, chloroform or acetal, I then extract it from the latter with a dilute aqueous solution of a strong acid such as sulfuric, hydrochloric, nitric or perchloric acids. Since the solubility of the neomycin salt or acid salt formed by this operation is an important factor, I prefer to use a dilute aqueous solution of sulfuric acid for this extraction step. In carrying out this extraction I prefer to add the acid solution in an amount sufficient such that the pH of the resulting solution ranges from about 0.4 to 1.0. At a pH greater than 1.0, the neomycin has a tendency to remain in the alcohol, ketone, chloroform or acetal as is indicated above where the higher pH's are shown to favor extraction from the medium to the alcohol, ketone, chloroform or acetal. A pH below 0.4 requires an uneconomical amount of acid besides endangering the stability of the neomycin.

The neomycin salt or acid salt, such as neomycin acid sulfate, obtained as above described, is next precipitated from the acid solution by the addition of a water soluble lower aliphatic alcohol until all of the neomycin salt or acid salt is precipitated. Generally, I prefer to use about 8 to 10 volumes of alcohol per volume of aqueous acid solution containing the neomycin salt or acid salt in order to insure complete precipitation of the neomycin salt or acid salt, which is then recovered by filtration or any other suitable means. The recovered neomycin salt or acid salt is then dissolved in water preferably to a concentration of approximately 20,000 units of neomycin per ml. of water. The neomycin unit as defined by Waksman is the minimum amount of neomycin that will completely inhibit the growth of *Escherichia coli* ATCC 9637 in one ml. of nutrient agar. The above concentration is such that the last drying step in my process does not require the removal of exceptionally large amounts of water.

The aqueous solution of neomycin acid sulfate obtained in the preferred procedure by dissolving precipitated neomycin acid sulfate in water as shown in the preceding step is next neutralized by adding to said aqueous solution a base which forms an insoluble precipitate with the excess acid sulfate such as an alkaline earth metal hydroxide. In carrying out the neutralization step, the alkaline earth metal hydroxide is added until the pH of the mixture reaches 7.

When an acid other than sulfuric acid is used it is, of course, necessary to use a base which forms an insoluble salt with the acid and which does not react with or otherwise harmfully affect the neomycin or salt thereof under the conditions of use. Furthermore the neutralization can as well be carried out by passing the neomycin acid salt solution through a strong basic anion exchange resin and thus converting the acid salt to the free neomycin base. The pH of the solution of the free neomycin base is then adjusted to 7.0 with a strong mineral acid, preferably sulfuric acid, to obtain the neutral neomycin salt solution. The neutralization procedure is unnecessary when the neomycin precipitated by the lower aliphatic alcohol addition step is in the form of a neutral salt.

When the neomycin acid salt is neutralized as shown above and the insoluble precipitate has been removed by any method such as for example by filtration, the remaining liquid is an aqueous solution of a neomycin neutral salt from which the neomycin neutral salt is readily recovered. The water can be removed from this solution by any suitable means such as by spray drying or by vaporization of the water under vacuum while in the frozen state.

The following examples are offered to illustrate my invention but the invention is not to be considered as limited to the examples as shown. The scope of my invention is defined by this specification and the attached claims and obvious equivalents of the materials and operations shown are to be considered as lying within the purview of my invention.

EXAMPLE I

The pH of a 2000 ml. portion of filtered neomycin fermented culture medium containing 350 u./ml. (700,000 units) was adjusted to 4.0 with sulfuric acid. To the filtered fermented medium 40 g. (0.6 g. of active ingredient/100 ml. of filtered medium) of "Santomerse-S" (30% solution of sodium salt of alkylbenzenesulfonic acid) was then added. A 250 ml. portion of 1-butanol was then added to the medium and the mixture was agitated to effect extraction. After agitation the mixture was allowed to settle and the layers were separated, measured and assayed. The water layer contained no neomycin while the 1-butanol layer amounting to 102 ml. assayed 5600 units of neomycin per ml. (571,200 u.). The pH of the butanol layer was then adjusted to 0.8 by adding 20 ml. of water and 2 ml. of concentrated sulfuric acid and stirring the mixture. The mixture was then allowed to settle and the aqueous acid layer amounting to 34 ml. and assaying 15,500 units of neomycin per ml. was then separated (527,000 units). The aqueous acid layer was then added with stirring to 340 ml. of methanol. The precipitated neomycin acid sulfate was collected, washed with methanol and dried to give a yield of 3.65 g. having an activity of 141 units of neomycin per mg. (514,650 units). The pH of a solution of 2.4 g. of neomycin acid sulfate (338,400 units) in 15 ml. of water was then adjusted to 7.0 with calcium hydroxide. The mixture was filtered and the filtrate frozen and dried under vacuum while frozen. A yield of 2 gms. of neomycin sulfate with an activity of 155 units/mg. was obtained (310,000 units).

EXAMPLE II

The following table shows the results of a number of extractions of neomycin from filtered neomycin culture medium (400 u./ml.) with 1-butanol wherein the amount of the sodium salt of alkylbenzenesulfonic acid ("Nacconol–NRSF") added to the medium and the amount of 1-butanol used to carry out the extraction were varied. Each experiment was carried out on a 100 ml. portion of filtered culture medium previously acidified to a pH of 4.0 with sulfuric acid.

*Table I*

| 1-Butanol, Vol.-ml. | "Nacconol NRSF," gms. | Water Layer, u./ml. | 1-Butanol Layer, u./ml. |
|---|---|---|---|
| 100 | 5 | 0 | 280 |
| 75 | 5 | 0 | 390 |
| 50 | 5 | 0 | 665 |
| 25 | 5 | 0 | 1,225 |
| 100 | 2 | 190 | 270 |
| 75 | 2 | 110 | 365 |
| 50 | 2 | 0 | 605 |
| 25 | 2 | 0 | 1,420 |
| 100 | 1 | 280 | 180 |
| 100 | 1 | 205 | 180 |
| 75 | 1 | 170 | 360 |
| 75 | 1 | 215 | 380 |
| 50 | 1 | 100 | 580 |
| 50 | 1 | 70 | 600 |
| 25 | 1 | 0 | 1,700 |
| 25 | 1 | 0 | 2,000 |
| 15 | 1 | 0 | 4,000 |
| 15 | 1 | 0 | 5,600 |
| 25 | 0.8 | 0 | 1,640 |
| 25 | 0.6 | 115 | 1,240 |

EXAMPLE III

The following table shows the results obtained when an alkylnaphthalenesulfonic acid instead of alkylbenzenesulfonic acid was added to the filtered fermented medium previously acidified with sulfuric acid. In these experiments 100 ml. of filtered fermented medium (1160 u./ml.) to which 3 g. of alkylnaphthalenesulfonic acid (in which the alkyl substituent was a mixture of higher alkyls) had been added was extracted with 25 ml. of 1-butanol.

*Table II*

| pH of Fermented Medium | Water Layer, u./ml. | Butanol Layer, u./ml. |
|---|---|---|
| 2.1 | 0 | 1,080 |
| 3.0 | 0 | 1,160 |
| 5.1 | 0 | 1,170 |
| 5.8 | 0 | 1,220 |

EXAMPLE IV

The following table shows the results obtained when chloroform was used to extract the neomycin from the filtered fermented medium (400 u./ml.) instead of 1-butanol. The filtered medium was previously acidified with sulfuric acid. The sodium salt of alkylbenzenesulfonic acid used was that known under the trade name of "Nacconol-NRSF."

*Table III*

| Filtered Medium, ml. | Filtered Medium, pH | Chloroform, ml. | "Nacconol," gms. | Water Layer, u./ml. | Chloroform Layer, u./ml. |
|---|---|---|---|---|---|
| 100 | 3.1 | 100 | 3 | 0 | 340 |
| 100 | 4.0 | 25 | 0.5 | 0 | 670 |
| 100 | 4.0 | 25 | 1.0 | 0 | 980 |
| 100 | 4.0 | 25 | 1.5 | 0 | 1,240 |
| 100 | 4.0 | 25 | 2.0 | 0 | 1,380 |

EXAMPLE V

An experiment was carried out wherein methyl ethyl ketone was used to extract the neomycin from the filtered fermented medium instead of 1-butanol. The pH of the 100 ml. of filtered fermented medium was adjusted to 3.1 with trichloroacetic acid and 5 g. of alkylbenzenesulfonic acid were added to the medium. The neomycin was then extracted with 100 ml. of methyl ethyl ketone. The ratio of units of neomycin in the methyl ethyl ketone layer to the units of neomycin in the fermented medium layer after extraction was 5;

$$\frac{\text{u./ml. in methyl ethyl ketone}=5.}{\text{u./ml. in fermented medium}}$$

EXAMPLE VI

The following table shows the results obtained when the pH of the filtered medium being extracted with 1-butanol was varied. Each experiment was carried out using 100 ml. of filtered medium (400 u./ml.) the pH of which was adjusted with hydrochloric acid and to which had been added 2 g. of "Nacconol-NRSF" and 100 ml. of 1-butanol.

Table IV

| pH of Fermented Medium | Water Layer u./ml. | 1-Butanol Layer u./ml. |
|---|---|---|
| 1.1 | 460 | 0 |
| 2.1 | 420 | low |
| 3.1 | 255 | 190 |
| 3.8 | 315 | 250 |
| 5.0 | 240 | 275 |
| 5.7 | 270 | 230 |
| 7.2 | 370 | 180 |

EXAMPLE VII

To one liter of a 1-butanol solution of neomycin containing 5400 units of neomycin per ml. and previously used to extract neomycin from the fermented medium was added a solution of 200 ml. water plus 20 ml. of concentrated sulfuric acid and the resulting mixture was stirred to effect extraction of the neomycin to the aqueous acid solution. The pH of the agitated mixture was 0.8. After agitation the mixture was allowed to settle and the layers were then separated. The aqueous acid layer amounted to 340 ml. having an activity of 14,600 units per ml.

EXAMPLE VIII

A 52 g. sample of neomycin acid sulfate assaying 160 units/mg. (8,300,000 units total) was dissolved in 200 ml. of water and the resulting solution passed through a bed of Amberlite XE–75 resin (a strong basic anion exchange resin manufactured by Rohm and Haas Co., Philadelphia, Pennsylvania) previously wetted with approximately 500 ml. of water, the wetted bed measuring one liter. The resin was then rinsed with 1300 ml. of water. The first 500 ml. of effluent was discarded. The remaining 1000 ml. of effluent was concentrated in vacuo to 92 ml. which solution of free neomycin base assayed 86,000 units/ml. (7,950,000 units total). The pH of the solution was then adjusted to 7.0 with 20% sulfuric acid to form a solution of neomycin sulfate and the volume was made up to 150 ml. with water to give a solution of neomycin sulfate having a potency of 50,000 units/ml. The solution of neomycin sulfate was then frozen and dried under vacuum while frozen to yield 36.5 grams of neutral neomycin sulfate assaying 247 units/mg.

Now having disclosed my invention, what I claim is:

1. In the recovery of neomycin from aqueous solutions thereof the process which comprises adding an organic sulfonic compound containing a hydrophobic alkyl group with at least six carbon atoms and selected from the group consisting of alkyl benzene and alkyl naphthalene sulfonates and sulfonic acids, to an aqueous solution of neomycin having a pH of from 2 to 7; extracting the said neomycin solution with a low molecular weight water-immiscible organic solvent selected from the group consisting of chloroform, dialkyl ketones, hydroxyalkanes and alkyl and hydroxyalkyl 1,3-dioxolanes; extracting the neomycin from the resulting organic-solvent layer with a dilute aqueous solution of a strong acid having a pH of from about 0.4 to 1; and recovering the neomycin from the resulting aqueous solution thereof.

2. The process of claim 1 wherein the aqueous solution of neomycin has a pH within the range of from about 3 to 5 during extraction with said water-immiscible solvent.

3. The process of claim 1 wherein the water-immiscible solvent is 1-butanol.

4. The process of claim 1 wherein the volume of the water-immiscible solvent employed in the extraction step is from about ⅛ to 1 volume per volume of aqueous solution.

5. In the recovery of neomycin from aqueous solutions thereof, the process which comprises adjusting the pH of such a solution to from about 3 to 5, adding a sulfonic compound containing a hydrophobic alkyl group with at least six carbon atoms and selected from the group consisting of alkyl benzene and alkyl naphthalene sulfonates and sulfonic acids, extracting the neomycin from the resulting solution with a low-molecular weight water-immiscible organic solvent selected from the class consisting of chloroform, dialkyl ketones, hydroxy alkanes and alkyl and hydroxyalkyl 1,3-dioxolanes, then extracting the neomycin from the resulting organic solvent layer with a dilute aqueous solution of a strong acid having a pH of from about 0.4 to 1, and precipitating the neomycin from the resulting aqueous acid solution by adding a water-miscible lower aliphatic alcohol.

6. The process of claim 5 wherein the amount of water-miscible alcohol used to precipitate the neomycin ranges from about 8 to 10 volumes of alcohol per volume of the aqueous acid solution of neomycin.

7. The process of claim 5 followed by dissolving the precipitate of neomycin salt in water, neutralizing the resulting solution with a base which forms an insoluble precipitate with the anion of the said strong acid, removing the precipitate, and recovering the resulting neutral neomycin salt from the solution.

8. The process of claim 5 followed by dissolving the precipitate of neomycin salt in water, passing this solution through a strongly basic anion exchange resin, neutralizing the resulting solution with sulfuric acid and finally dehydrating the neutralized solution to recover a dry solid neutral neomycin sulfate.

9. The process of claim 5 wherein the strong acid is sulfuric acid and wherein the precipitated neomycin acid sulfate is dissolved in water, the solution is then neutralized with calcium hydroxide, the resulting precipitate of calcium sulfate is removed and a neutral neomycin sulfate is recovered from the neutralized solution.

References Cited in the file of this patent

UNITED STATES PATENTS

| | | |
|---|---|---|
| 2,474,758 | Peck | June 28, 1949 |
| 2,501,014 | Wintersteiner | Mar. 21, 1950 |
| 2,505,318 | Alburn | Apr. 25, 1950 |
| 2,546,267 | Kuehl | Mar. 27, 1951 |
| 2,560,891 | Regna et al. | July 17, 1951 |

OTHER REFERENCES

Peck on Streptothricin in J. A. C. S., May 1946, vol. 68, pages 772–776.

O'Keeffe on Streptomycins in J. A. C. S., July 1949, vol. 71, pages 2452–2457.

Regna on Streptomycin in J. A. C. S., vol. 71, August 1949, page 2939.

Kocholaty on Sulfactin in J. Biol. Chem., vol. 168, May 1947, pages 765–769.

Murray on Circulin in J. Bact., March 1949, vol. 57, pages 305–312, page 308 relied on.

Swart on Fradicin in Proc. Soc. Exptl. Biol. & Med., March 1950, vol. 73, pages 376–377.

Waksman in Science, March 25, 1949, vol. 109, pages 305–307.

Swart in Arch. of Biochem., November 1949, vol. 24, pages 92–103.

Peck et al., article in J. A. C. S., vol. 71, July 1949, pages 2590 and 2591.